United States Patent [19]
Clark et al.

[11] Patent Number: 6,137,907
[45] Date of Patent: Oct. 24, 2000

[54] METHOD AND APPARATUS FOR PIXEL-LEVEL OVERRIDE OF HALFTONE DETECTION WITHIN CLASSIFICATION BLOCKS TO REDUCE RECTANGULAR ARTIFACTS

[75] Inventors: Raymond J. Clark; Jeng-Nan Shiau, both of Webster, N.Y.

[73] Assignee: Xerox Corporation, Stamford, Conn.

[21] Appl. No.: 09/159,041

[22] Filed: Sep. 23, 1998

[51] Int. Cl.$^7$ ........................................... G06K 9/34
[52] U.S. Cl. ..................... 382/180; 382/176; 382/224
[58] Field of Search ..................... 382/180, 173, 382/176, 224, 270; 358/462, 467

[56] References Cited

U.S. PATENT DOCUMENTS

| | | | |
|---|---|---|---|
| 5,073,953 | 12/1991 | Westdijk | 382/176 |
| 5,293,430 | 3/1994 | Shiau et al. | |
| 5,339,172 | 8/1994 | Robinson | 358/462 |
| 5,987,221 | 11/1999 | Bearss et al. | 382/176 |

*Primary Examiner*—Phuoc Tran
*Attorney, Agent, or Firm*—Fay, Sharpe, Fagan, Minnich & Mckee, LLP

[57] ABSTRACT

A method and apparatus to process an electronic image of a document that is previously divided into a plurality of classified tiled rectangular blocks. Each pixel within halftone blocks is analyzed to calculate a busyness measure value, preferably a sum of Laplacians although other range-type functions could be used. When the busyness value is less than a first predetermined threshold value, the video intensity level of the pixel is compared against a second predetermined threshold value and when greater than the second predetermined threshold value, the pixel is re-classified as being a Text document type to produce a crisp, clean background in the rendered image. When the video intensity level of the pixel is less than the second predetermined threshold value, the pixel is re-classified as being a Contone image type to minimize abrupt changes in pixel classification block boundaries, which would result in objectionable artifacts in the rendered image resulting from density or texture changes at the block boundaries. Selectively re-classifying individual pixels within blocks of tiled pixels that were previously classified as halftone pixels greatly reduces rectangular artifacts in the classification map. Such rectangular artifacts in the classification map are often translated by classification driven image processing into undesirable rectangular artifacts when the image is viewed or analyzed further. Certain classification transitions are thereby moved to coincide with contours and transitions in the image video, thereby hiding the classification transitions.

20 Claims, 5 Drawing Sheets

METHOD AND APPARATUS FOR PIXEL-LEVEL OVERRIDE OF HALFTONE DETECTION WITHIN CLASSIFICATION BLOCKS TO REDUCE RECTANGULAR ARTIFACTS

BACKGROUND OF THE INVENTION

The present invention is directed to the art of image processing and, more particularly, to a method and device for improving pixel block classification schemes by post-processing individual pixels to selectively override halftone classification in blocks of pixels that extend across classification boundaries in a digital image. The present invention will be described in connection with digital printers but finds application in a wide range of other environments and applications including anywhere blocks of digital image pixels are segmentated or classified.

In the reproduction of images from an original document or images from video image data, and more particularly, to the rendering of image data representing an original document that has been electronically scanned, one problem that arises is the limited reflectance domain resolution capabilities of the equipment because most output devices are binary or require compression of the data into binary form for storage efficiency. This is particularly evident when attempting to reproduce halftones, lines, and continuous tone (contone) images. An image data processing system may be tailored so as to offset the limited reflectance domain resolution capabilities of the rendering apparatus. This tailoring, however, is difficult due to the divergent processing needs required by different images which may be encountered by the rendering device. In this respect, it should be understood that the image content of the original document typically consists of multiple image types. The image types include halftones of various frequencies, continuous tones (contones), line copy, text, error diffused images, dithered areas, dot patterns or combinations of any of the above together with some unknown degree of some or all of the above or additional image types.

In view of the situation, optimizing the image processing system for one image type in an effort to offset the limitations in the resolution and the depth capability of the rendering apparatus may not be possible, requiring a compromised choice which may not produce acceptable results. Thus, where a system is optimized for low frequency halftones, it is often at the expense of degraded rendering of high frequency halftones, or of line copy, text, and vice-versa.

To address this particular situation, prior art devices have utilized automatic image segmentation to serve as a tool to identify different image types or imagery. For example, in one such system, image segmentation was used to apply a function to the video image signal, the output of which was used to instruct the image processing system as to the type of image data present so that it could be processed appropriately. In particular, auto-correlation functions were applied to a stream of pixel data to detect the existence and estimate the frequency of halftone image data. These prior methods automatically process a stream of image pixels representing unknown combinations of high and low frequency halftones, contones, text, and/or lines. The auto-correlation function was applied to the stream of image pixels, and for the portions of the stream that contain high frequency halftone image data, the function produced a large number of closely spaced peaks in the resulting signal.

In another auto-segmentation process, an auto-correlation function is calculated for the stream of halftone image data at selected time delays which are predicted to be indicative of the image frequency characteristics, without prior thresholding. Valleys in the resulting auto-correlated function are detected to determine whether a high frequency halftone image is present.

One such example of a prior art automatic segmentation method and device is described in U.S. Pat. No. 5,293,430, the teachings of which are incorporated herein by reference. The basic system of that patent as shown in FIG. 1 is made up of three primary modules. Input information stored in a data buffer 10 is simultaneously directed to an image property classifying section 12, the first primary module, and an image processing section 14, the second primary module. The image property classifying section 12 is made up of any number of sub-modules, but preferably includes at least an auto-correlator 16 and a discriminator 18, which determine whether a block of image pixels stored in the data buffer 10 is one type of imagery or another such as, for example, high or low frequency halftone, line, text, or contone image types.

In parallel with the image property classifying section 12, the image processing section 14 is made up of any number of sub-processing sections including as examples, a high frequency halftone processor 20, a low frequency halftone processor 22, a line/text processor 24, and a contone processor 26. The sub-processing sections within the image processing section 14 perform image processing operations on the same block of image pixels as does the image property classifying section 12. Each image sub-processing section performs image processing operations that are adapted to improve the image quality of a distinct class of imagery.

The third module of the prior art automatic segmentation system shown in FIG. 1 is a control section 28 that uses the information derived from the image classifying section 12 to control the flow of processed image data generated by the image processing section 14. The control section 28 essentially functions as a multiplexer and selects the proper processed image data from among the sub-processing sections 20–26 for delivery to an output buffer 29 according to the image classification determined by the image classifying section 12.

The decision as to what class of imagery the image data belongs to is typically binary in nature. For example, in a conventional image segmentation scheme, the image property classifying section 12 classifies image data as one of three broad classes of imagery including halftone of various frequencies, text, and continuous tone. Depending on those classifications, the image data is processed according to the particular properties of that class of imagery using a range of well known various techniques and algorithms. As an example, if the data is determined to be high frequency halftone, that data is low pass filtered and then re-screened. When the data is determined to be low frequency halftone data, it is compared against a random threshold value. According to another technique, when the decision as to which of the three broad classes of imagery the data belongs is based on a single image property such as peak count of the input image data, the resulting image classification decision is made by thresholding the peak count into three classes of imagery.

Consequently, the control section 28 decides the type of image processing that is required by the image data depending on the decision made by the classification section 12. Thus, the output of the classification section 12 is quantized to one of three broad possibilities with finer classifications, e.g. high/low frequency halftone, as necessary. The control section 28 selects the output for delivery to the output buffer 29 from one of the four image sub-processing sections 20–26 based upon this classification.

In conventional image classification systems, the classifying information is gathered over a context of many pixels and typically changes gradually. However, during the process of comparing this classifying information with one or more classification thresholds, abrupt changes in the classes of blocks of pixels often occur. Abrupt decision making produces a forced choice among several distinct alternative choices and is a primary reason for the formation of visible artifacts in the resulting output image. Most transition points or thresholds are selected so that an image can be classified as one class of imagery with a high degree of certainty. However, some blocks of pixels cannot easily be classified into the several broad groups of imagery types with such certainty because the blocks span multiple transition points or they span a transition zone between different image types.

As noted above, algorithms for classifying image pixels according to document type such as, for example, text, contone, and halftone make their decision based on image context in the vicinity of the pixel being classified. Typically, tiled rectangular blocks of the document are analyzed with the result of the analysis being used to classify all pixels within that block as a single image type.

FIG. 2 illustrates a plurality of tiled rectangular blocks 30, 32, 34, and 36 within a document 38 that was processed to identify the imagery types using any one of the prior art classification schemes described above. As shown, each of the plurality of tiled rectangular blocks 30–36 includes an equal number of pixels 40, 42, 44, 46 because the blocks are arranged in regularly repeating rows and columns within the document image 38. Further as shown in FIG. 2, the size of each of the plurality of rectangular blocks 30–36 is typically selected to be large enough to hold several halftone cells 50, 52, 54, and 56 so that halftone images can be formed by the rendering device after the data is processed.

Generally, the regularly repeating rows and columns of tiled rectangular blocks are necessitated by the algorithms used to classify image pixels according to document type. The algorithms examine the image context around each pixel. As an example, in order to reliably detect the presence of a halftone pattern and produce sufficient information to guide downstream processing, a context covering several halftone cells 50–56 is required. A 65 LPI halftone cell covers a 10×10 pixel area in an image sampled at 600 SPI. A 141 LPI halftone cell covers about 3×3 pixels. In order to provide this context and ensure the ability to classify the image pixels according to document type, the images are typically analyzed over tiled rectangular blocks 30–36 whose boundaries are fixed relative to the edges of the document image 38. For each block, the results of analyzing the video in the block are used to classify all of the pixels 40–46 in that respective block 30–36. Although it is desirable for these blocks 30–36 to be as small as possible, they must, as a practical matter, contain several halftone cells 50–56 if the document noise is not to be falsely detected as a halftone and for the halftone frequency to be accurately determined. An example of a typical rectangular block size is a 1 mm sq.

Classification based on information derived from tiled blocks results in pixel classification changing at the block boundaries, which is unlikely to be the correct place. As shown in FIG. 2 in somewhat exaggerated form, the first rectangular block 30 lies entirely within a non-halftone region 60 of the document image 38. The second, third, and fourth rectangular blocks 32–36 each lie more or less across the boundary 64 between the non-halftone region 60 and the halftone region 62 of the document image 38. Since all of the pixels 42 in the second rectangular block 32, as an example, will be classified as either being halftone or non-halftone pixels, those pixels that are misclassified and extend over the boundary 64 will contribute to the overall rectangular artifacts generated in the reprographic system, since inappropriate processing will have been applied to an area with rectangular boundaries rather to an area with the natural boundary 64. Similarly with respect to the third and fourth group of pixels 44, 46, in the third and fourth rectangular blocks 34, 36, those pixels that extend over the boundary 64 are classified together with the remaining pixels in their respective blocks. This tends to cause rectangular artifacts in the image.

It is therefore desirable to provide a system that enables a pixel-level override of halftone detection within classification blocks to reduce rectangular artifacts generated in a reprographic system.

SUMMARY OF THE INVENTION

In accordance with the present invention, a method and apparatus is provided for post-processing and selectively re-classifying pixels within classification blocks for reducing rectangular artifacts.

More particularly, in accordance with the present invention, when a block level analysis indicates that a pixel block is classified as a halftone image type, a measure of the video variation in a local region is calculated to determine a "busyness" measure value, preferably through the use of a sum of the absolute values of the Laplacians. Other "range-type" functions such as, for example, a maximum video value less a minimum video value within a context of 5×5 pixels would similarly provide reasonable results as an alternative to the sum of the Laplacians. In any case, when the video variations in local regions are less than a predetermined level, the actual pixel video value is analyzed as a further constraint. If the pixel video value is above (whiter than) a pre-defined value, the pixel is assumed to be background and is therefore re-classified to a pixel classification that will be processed by the imaging device to have a clean background. In the preferred embodiment, the pixel is re-classified as text since most imaging devices are adapted to render document areas identified as being text with a bias towards a clean background. When the pixel video value is below (darker than) the pre-defined video value, the pixel is re-classified as contone type. When the video variation in the local region, or "busyness", is determined to be greater than the predefined threshold amount the pixel is left unchanged, retaining its original halftone classification.

A major advantage of the invention lies in the ability to selectively re-classify portions of a digital image on a per-pixel basis, adapting pixel classification in areas where classification blocks cross boundaries between halftoned and non-halftoned areas to reduce the effects of rectangular artifacts.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts and in certain steps and arrangements of steps, a preferred embodiment of which will be described in detail in this specification and illustrated in the accompanying drawings which form a part hereof, and wherein.

DETAILED DESCRIPTION OF THE PREFERRED EMBODIMENT

Figure 1:
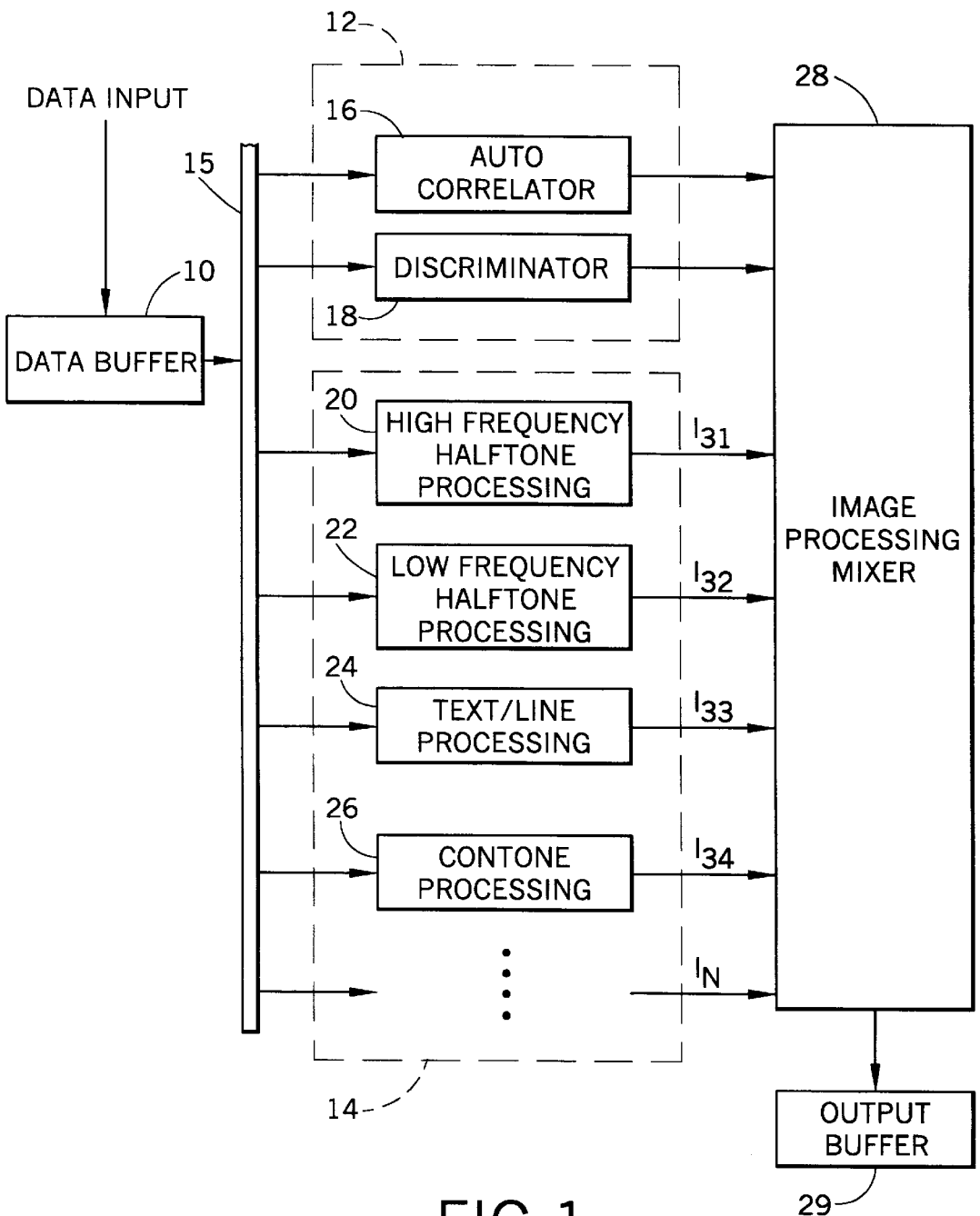
FIG. 1 is a block diagram illustrating a prior art image processing system.
Figure 2:
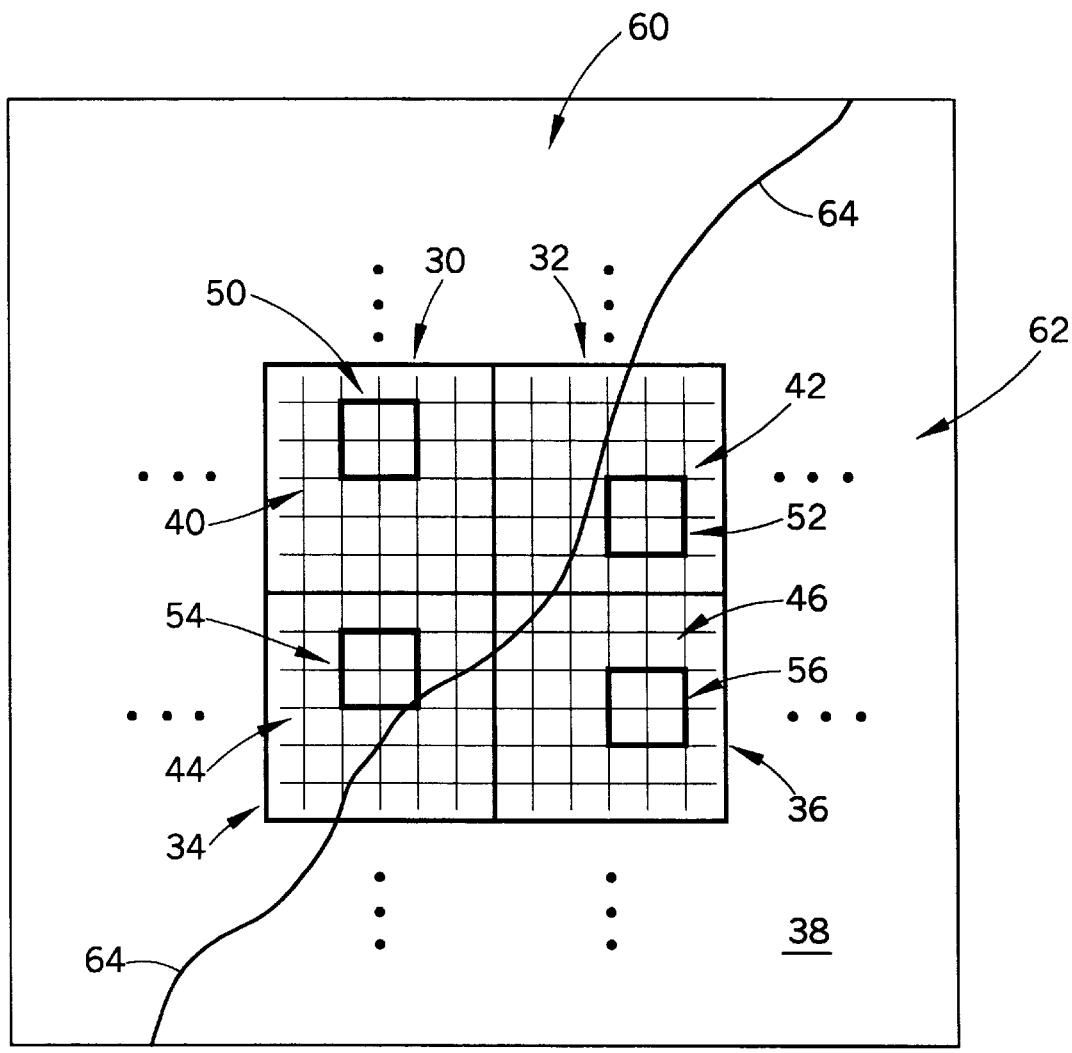
FIG. 2 is an illustration of a portion of a document image showing tiled rectangular blocks spanning multiple classification boundaries.

The following is a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as a multiple photosite array of charge couple devices commonly referred to as CCDs. Line by line scanning of an image bearing the original for the duration of image data is well known and does not form a part of the present invention.

Image data may also be derived by a computer workstation program in accordance with document creation application software or from a data storage device. In content, the original video image signals may be composed entirely of a single image component such as lines, text, low frequency halftones, high frequency halftones, contones, background, or any combination thereof.

The following description also includes references to video signal levels. In describing the present invention, it is assumed that the video signal has a value in a range between 0 an 255. However, any range for the video signal can be utilized in conjunction with the present invention. Furthermore, in the following description, the term "grey level" will be used to describe both black and white and color applications.

Furthermore, in describing the present invention, the term "pixel" will be utilized. This term may refer to an electrical (or optical, if fiber optics are used) signal which represents the physical measurable optical properties at a physical definable area on a receiving medium. The receiving medium can be any tangible document, photoreceptor, or marking material transfer medium.

Moreover, the term "pixel" may refer to an electrical (or optical, if fiber optics are used) signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel" in the scanning environment, may refer to an electrical (or optical, if fiber optics are used) signal which represents physical optical property data generated from a signal photo sensor cell when scanning a physical image so as to convert the physical optical properties of the physical image to an electronic or electrical representation. In other words, in this situation, a pixel is an electrical (or optical) representation of the physical optical properties of a physical image measured at a physical definable area on an optical sensor. The term "pixel," in the rendering environment, may refer to an electrical or optical signal which represents the smallest physical area on a recording substrate that can be rendered. In other words, in this situation, a pixel is an electrical or optical representation of the physical spot created by a laser in a laser printhead or the physical spot created by the smallest rendered ink droplet.

Many of the documents produced today are compound documents in that they are composed of several different sub-images that are of different image types or image classes. Some of the common types are text, photos (contones), and halftones. One reason for the increased appearance of compound documents is the widespread use of commercially available word processing and desktop publishing software that is able to generate documents of ever-increasing complexity.

As is well known, different types of images require different processing in order to provide optimal image quality. Conventionally, to automatically choose the best processing for different areas of an image, each area is classified into one of several pre-defined classes to determine how to render that part of the image. This image type or image class information is then used to determine the appropriate processing required to obtain a good rendition of the image when printing, to choose a method of image compression, to determine if optical character recognition would be useful, to select a suitable rendering transfer function, etc.

However, as noted previously, the classification process should not be so crisp as to cause problems when the input image is not very similar to any of the classes, or the input images properties straddle or extend across the border between two classes.

For example, if a particular action is taken based upon a single class identification because the classes are mutually exclusive, it may create undesirable results for a non-prototype image. This is seen when rendering images for printing on a xerographic printer. The classification of the image can cause output artifacts such as when a halftone image is classified as a contone image.

Another type of problem is that adjacent areas of the image may be classified differently due to small variations in the image. This is called class switching. If this information is used for image enhancement and printing, the output may have objectionable artifacts due to local variations. Examples of these objectionable artifacts are grainy image outputs.

Figure 3:
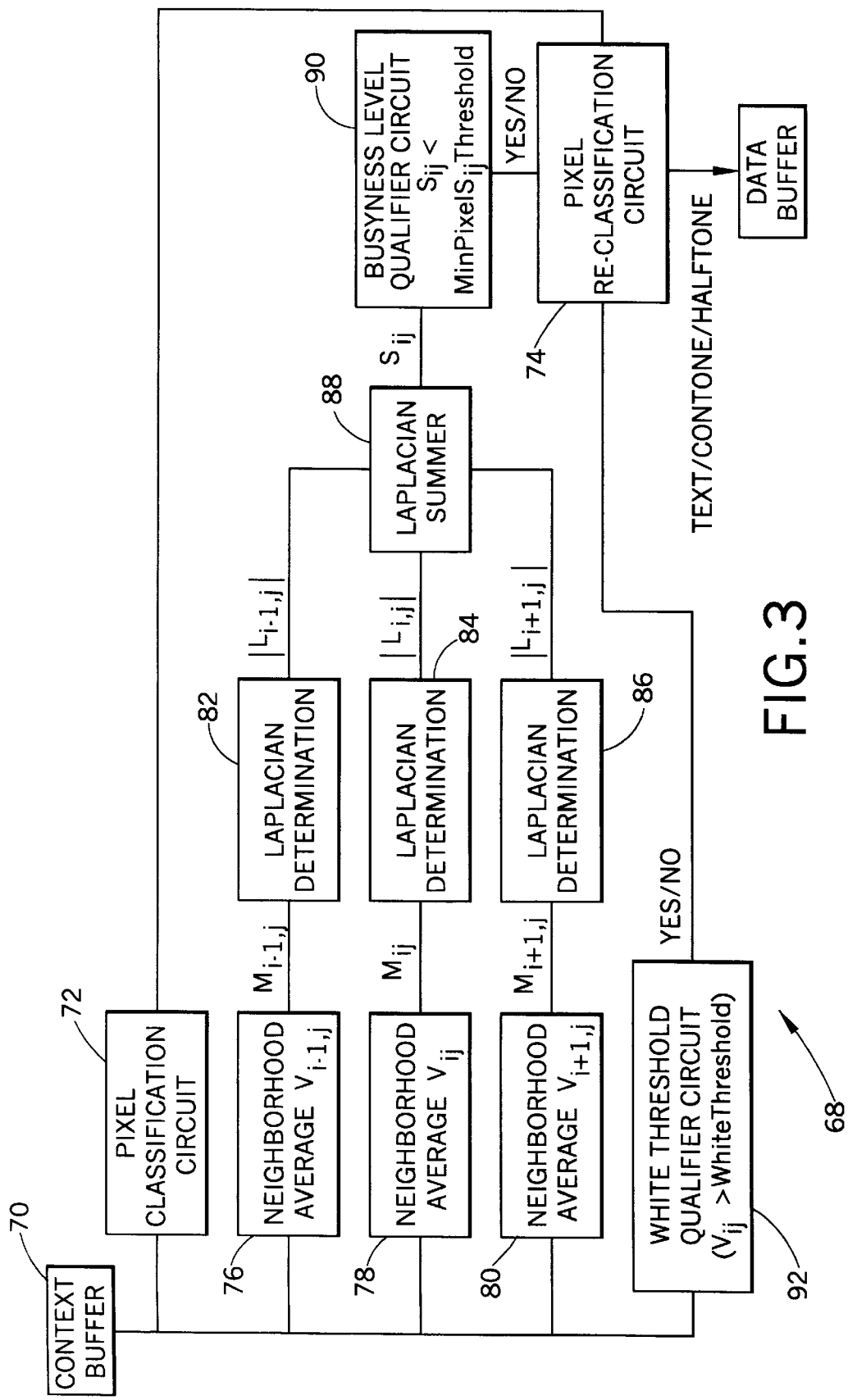
FIG. 3 is a block diagram illustrating a preferred image processing system for re-classifying pixels in accordance with the present invention.
Figure 4:
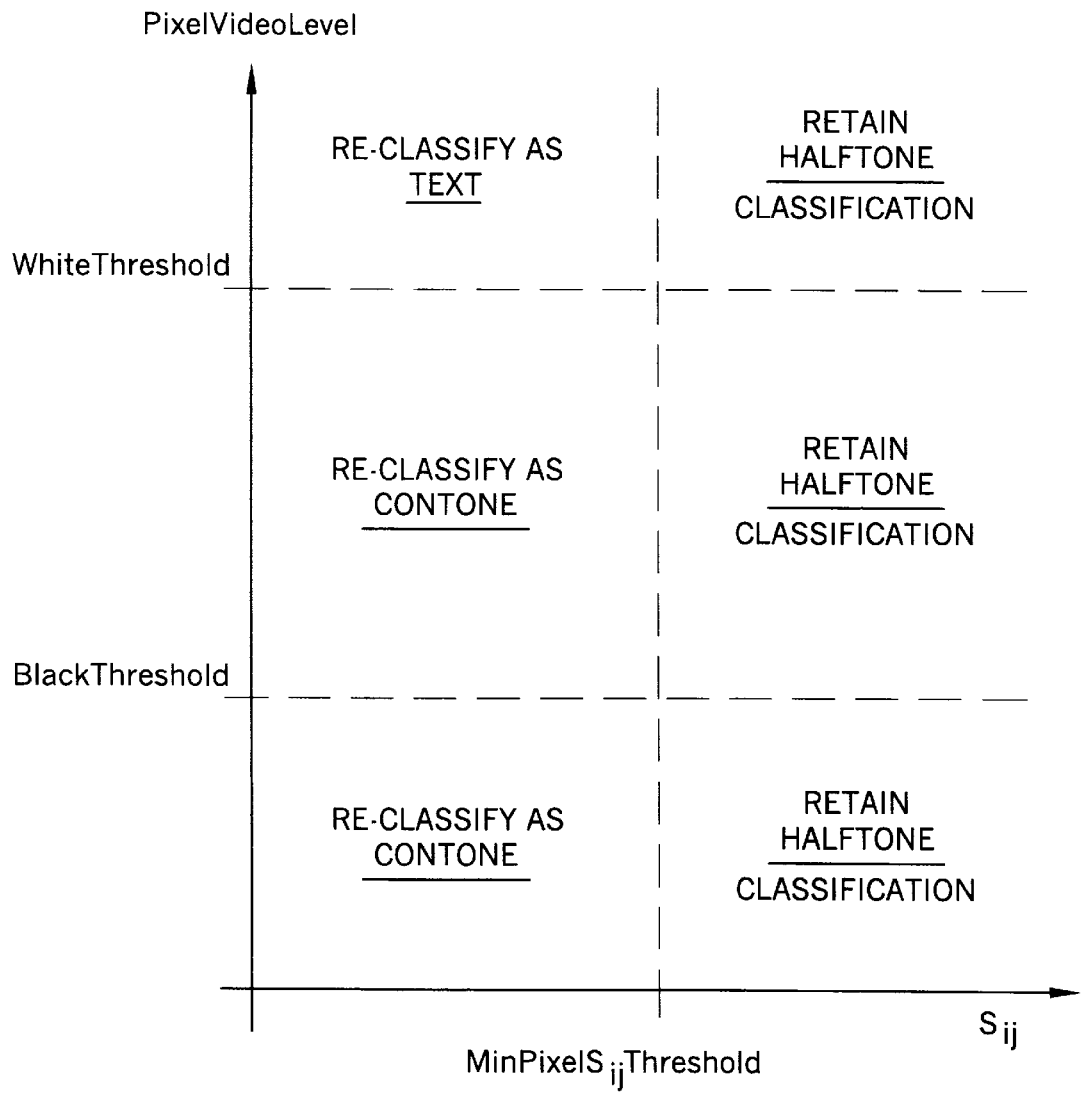
FIG. 4 is a graph illustrating the pixel re-classification system of the present invention in PixelVideoLevel—$S_{ij}$ plane; and, FIG. 5 is a flow chart illustrating a preferred example of an image processing method for re-classifying pixels in accordance with the present invention.
Figure 5:
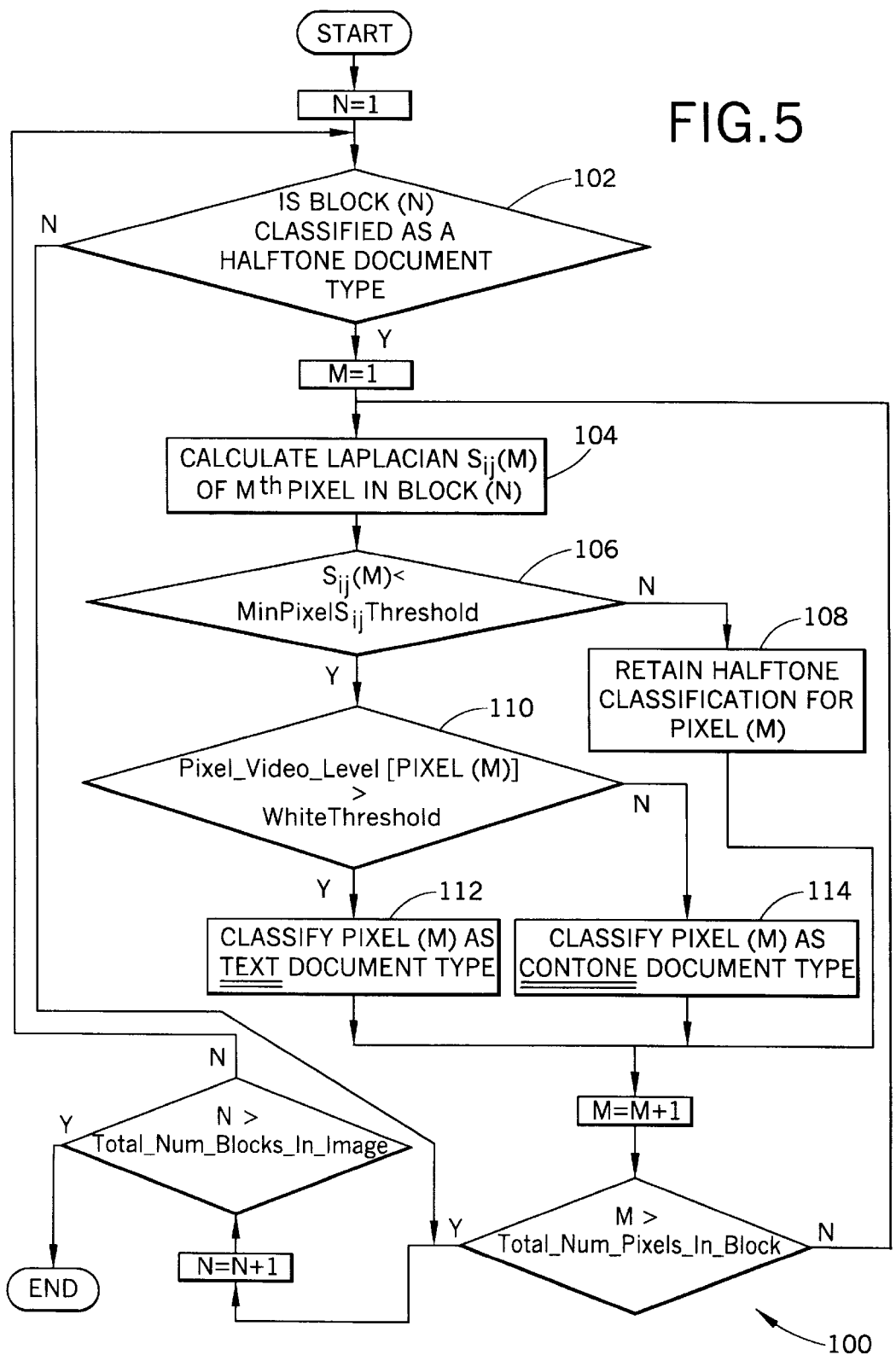

Turning now to FIGS. 3–5 and the pseudo-code fragment shown below, the present invention uses an image "busyness" measure to selectively override halftone classification in areas of a document image which do not appear to be as "busy" as a halftone pattern would be expected to be. Many "range-type" functions could be used to derive a "busyness" measure value such as, for example, a simple difference between the maximum video value and a minimum video value within a context surrounding the pixel such as a 5×5 pixel matrix.

Preferably, however, the busyness measure in accordance with the present invention is the sum of the absolute values of the Laplacians $S_{ij}$ over a small neighborhood. The sum of the absolute values of the Laplacians $S_{ij}$ is preferably determined in the context of the pixel to be re-classified. The present invention overrides halftone classification in small areas to selectively re-classify individual pixels as necessary, depending upon the video level. In the light "non-busy" areas of the image, the present invention selectively re-classifies pixels within blocks that straddle the boundary between image halftone areas and image background areas to avoid misclassifying background pixels as halftone pixels. In the dark "non-busy" areas of the image, the pixels are selectively re-classified within blocks to a classification which will avoid abrupt changes in density levels between blocks.

A pseudo-code portion describing the preferred algorithm of the present invention in general terms is shown immediately below:

```
if( Block analysis indicates Halftone ) {
    if( S_ij of Pixel < MinPixelS_ijThreshold ) {
        if( PixelVideoLevel > WhiteThreshold ) {
            Classify Pixel as Text to clean up background. Presumably
            the video in the adjacent classification block is similar,
            and so will also be classified as Text.
        } else if (PixelVideoLevel < BlackThreshold) {
            Classify Pixel as Contone to minimize abrupt density level
            changes. Presumably the video in the adjacent
            classification block is similar, and so will also
            be classified as Contone.
        } else {
            Classify Pixel as Contone to minimize abrupt density level
            changes. Presumably the video in the adjacent
            classification block is similar, and so will also
            be classified as Contone.
        }
    } else {
        Retain Halftone Classification.
    }
}
```

In the pseudo-code above, the busyness measure value is preferably calculated as sum of the absolute values of the Laplacians in the context of the eight pixels surrounding each subject pixel $Pixel_{ij}$. This sum of the absolute values of the Laplacians is referred to as $S_{ij}$ which is compared against a minimum busyness value $MinPixelS_{ij}Threshold$. The magnitude of the minimum busyness value is selected so that pixels are tested for re-classification only in areas of the document image that do not appear to be as "busy" as a halftone pattern would be expected to be. Pixels that have a busyness value above the minimum busyness value $MinPixelS_{ij}Threshold$ are at least as busy as a halftone pattern would be expected to be, and are therefore are not tested for re-classification according to the present invention as shown in the "else {Retain Halftone Classification}" portion of the pseudo-code above.

In areas of the document image that were previously classified as halftone but have a busyness value $S_{ij}$ that is less than would be expected in a halftone region, the video level of each pixel PixelVideoLevel is compared against a predetermined white threshold video level value WhiteThreshold. Preferably, the predetermined WhiteThreshold video level value is selected to be the white level of the paper on which the document is printed. Once this threshold is set, any video whiter than this threshold is by definition not document information and should not be reproduced. Since the typical reflectance of paper is within the range of between 80–90 percent, the predetermined WhiteThreshold video level value is selected to be at a level that represents this range.

In typical physical downstream rendering systems, it is very difficult to faithfully reproduce video levels that are near or above the white level of the paper on which the document is printed. Typically, attempts to render this level of brightness create a very light dispersion of marking material such as toner or ink. This is know as "background" in the copier industry and is very undesirable. For this reason, pixels having a video level above the predetermined white threshold video level value WhiteThreshold are rendered in accordance with the present invention with a transfer function which translates white video (video above WhiteThreshold) to be even whiter. To avoid abrupt transitions between the greyscale range of the document information and white areas, the pixels are not translated into pure white because objectionable abrupt jumps from light grey to pure white create artifacts in the document. For this reason, in accordance with the present invention, the pixels are selectively re-classified so that the rendering device will employ a transfer function which turns steeply toward pure white but does not jump directly thereto. One convenient transfer function that behaves as described above is a text classification. Accordingly, as shown in the code above, pixels having a video level above the predetermined white threshold video level value WhiteThreshold are re-classified as text in order to minimize "background" on the copy. It is to be understood, however, that classifications other than the "text" classification can be used to provide the desired transfer function which turns steeply toward pure white but does not jump directly thereto. The text classification is conveniently readily available.

In the pseudo-code above, pixels having a video level value less than (darker than) the predetermined white threshold video level value WhiteThreshold are re-classified in a manner to cause the rendering device to apply a transfer function that best avoids abrupt changes in density levels between halftone areas and continuous tone, non-background areas. Pixels having a video level value less than the WhiteThreshold value are re-classified as contone as well as are pixels that have a video level value less than a predetermined black threshold video level value BlackThreshold.

In accordance with the present invention, the black threshold video level value BlackThreshold is set at the expected reflectance level of the black ink on the printed page. In the present invention, dark areas which are not halftones are processed, nonetheless, like all other contones. This results in the dark non-halftoned pixels to be rendered with a density which is similar to that of the adjacent halftone region, rather than as a solid, dark black area as would be produced by a transfer function designed to force non-information bearing video to a presumed intended black level.

One advantage of re-classifying pixels having a video level below the predetermined black threshold video level value BlackThreshold as contone is that the system becomes less sensitive to a precise selection of the black threshold video level value BlackThreshold. In instances where the BlackThreshold level is chosen too high, the video density level of areas which will be re-classified erroneously from halftone to contone will be faithfully preserved. Presumably the video adjacent the erroneously re-classified block is contone also, and so any transition in texture or density will coincide with a change in image structure and so will not be noticeable. If the entire block were left halftone, then the boundary between halftone and the presumed contone of the next block would cause the boundaries of the classification block to be visible. If text or another classification with similar processing were applied instead, the potential would exist for not accurately preserving the density, making the rectangular boundaries of the classification block very visible on both sides by forcing information bearing video to solid black.

When the BlackThreshold level is chosen too low, areas which are adjacent to halftone regions and intended by the creator of the document to be solid black, but are erroneously re-classified as contone, will at least have their density level faithfully preserved, matching the adjacent halftone blocks, as well as blending with presumed contone or text blocks on the other side. Because the selective override of the invention is performed on a pixel level basis, the transition from halftone to contone classification is gradual and conforms to the natural contours of the image. If these pixels were reclassified as text or another classification with similar processing, then the "non-busy" pixels would be forced to black, creating objectionable artifacts. If they were left halftone, the classification would change abruptly from halftone to contone or text at the next block boundary, making that boundary objectionably visible. These failure modes are much more likely to occur in dark areas of the document than the analogous failure modes in the white areas because the BlackThreshold must generally be estimated from much less information due to typical document content, sensor and electrical signal to noise ratio, and quantization noise all being typically much worse in black areas. Furthermore, the human eye is much more sensitive to small changes in density in dark areas than in light areas, making small variations visible and highly objectionable. In accordance with the present invention, therefore, in dark areas of the document image, the selective re-classification of the pixels as contone prevents abrupt changes in density levels that might be noticeable in the printed document as artifacts.

With reference now to FIG. 3, wherein a block diagram of one possible embodiment of a pixel-level override device 68 formed in accordance with the invention is shown, video input is initially delivered to a context buffer 70, which for a pixel $V_{ij}$ under consideration, stores a 5×5 matrix or block of pixel values centered on pixel $V_{ij}$. The values are initially directed to a pixel classification circuit 72, which is programmed to determine that the block of pixels centered on pixel $V_{ij}$ should be classified as being of the halftone document type. The output flags of the busyness level qualifier circuit 90 and the white threshold qualifier circuit 92 are used by a pixel re-classification circuit 74 to determine whether the pixel $V_{ij}$ should be re-classified. In the event that the pixel $V_{ij}$, or any pixel within the block containing the pixel $V_{ij}$, is not classified as a halftone document type, no re-processing or selective re-classification is executed in accordance with the invention.

Neighborhood averager circuits 76, 78, and 80 sum and average the eight neighbors of center pixel $V_{ij}$. Each averager respectively derives average values $M_{i-1,j}$, $M_{i,j}$, $M_{i+1,j}$, for locations $V_{i,j}$, $V_{i-1,j}$, and $V_{i+1,j}$, by summing the values of the eight neighbors surrounding the pixel $V_{i,j}$, and then converting the result of the division to an integer. This average value is used to determine a Laplacian sum as will be described hereinafter. The three averages are used to compute the Laplacian sums needed for context when computing the Laplacian sum $S_{ij}$.

The absolute value of the Laplacian is found by subtracting the center pixel from the average of its eight neighbors, $M_{ij}$ and then forming a two's complement of the result if it is negative $|L_{ij}=M_{ij}-V|_{ij}$. The absolute Laplacian values are determined at a first Laplacian determination circuit 82 operating on $M_{i-1}$, a second Laplacian determination circuit 84 operating on $M_i$, and a third Laplacian determination circuit 84 operating on $M_{i+1}$. The absolute Laplacian values are then summed at a Laplacian summer circuit 88. The Laplacian summer circuit includes a two stage pipeline to enable it to add these columns of numbers simultaneously. The absolute value of the Laplacian for $V_{ij}$ at each of its eight neighbors is summed together and termed $S_{ij}$. This value is used as a discriminator in a busyness level qualifier circuit 90.

If the sum of the absolute values of Laplacians for $V_{ij}$ and each of eight neighbors $S_{ij}$ is not below a predetermined minimum local area busyness level threshold value MinPixelS$_{ij}$Threshold, the original video value for the pixel $V_{ij}$ is passed directly to the pixel re-classification circuit 74 and is not re-classified. A white threshold qualifier circuit 92 is used to compare each pixel video level value against a predetermined white threshold value WhiteThreshold. When the busyness level of the pixel is less than the threshold value MinPixelS$_{ij}$Threshold and the video level of the pixel is above the white threshold value WhiteThreshold, the pixel re-classification circuit 74 re-classifies the pixel as text. On the other hand, when the busyness level of the pixel is less than the threshold value and the video level of the pixel is below the white threshold value WhiteThreshold, the pixel is re-classified by the re-classification circuit 74 as contone.

In accordance with the preferred embodiment of the invention, the pixel re-classification circuit 74 does not re-classify pixels that have an $S_{ij}$ that is greater than the predetermined minimum busyness value MinPixelS$_{ij}$Threshold. This is shown in the right column in FIG. 4. On the other hand, pixels that do have their sum of the absolute values of the Laplacians less than the predetermined minimum busyness value MinPixelS$_{ij}$Threshold are re-classified as shown on the left in FIG. 3. For those pixels that are re-classified, the predetermined white threshold value WhiteThreshold is used to classify the pixels as being one of either a text document type or a contone document type. Pixels having a video value greater than the white threshold value WhiteThreshold are re-classified as text as illustrated in the upper left column in FIG. 4. On the other hand, those pixels having a video pixel value less than the white threshold value WhiteThreshold are re-classified as contone imagery as illustrated in the lower left in FIG. 4.

Turning lastly now to FIG. 5, an example of a method for re-classifying pixels 100 in accordance with the present invention is illustrated. Initially, a test is performed at step 102 to determine whether a block of pixels is classified as a halftone document type. This step is executed by the pixel classification circuit 72 in a manner as described above. When a block of pixels is classified as being a halftone document type, the Laplacian $S_{ij}$ of each pixel $V_{ij}$ in the block is calculated at step 104. The sum of the absolute values of the Laplacians over a small neighborhood is calculated in step 104 in a manner described above in connection with the neighborhood averager circuits 76–80 and the first, second, and third Laplacian determination circuits 82, 84, and 86 and the Laplacian summer circuit 88.

At step 106, the sum of the absolute values of the Laplacians over the small neighborhood is compared against a predetermined minimum busyness threshold value MinPixelS$_{ij}$Threshold. When the sum of the absolute values of the Laplacians over the small neighborhood is larger than the predetermined minimum busyness threshold value MinPixelS$_{ij}$Threshold, the halftone classification is retained for the pixel $V_{ij}$. On the other hand, when the sum is less than the predetermined threshold value, the video level of the pixel $V_{ij}$ is compared against a predetermined white threshold value WhiteThreshold at step 110. When the video value of the pixel $V_{ij}$ is greater than the predetermined white threshold value WhiteThreshold, the pixel $V_{ij}$ is re-classified at step 112 as being of the text document type. On the other hand, when the video value of the pixel $V_{ij}$ is less than the predetermined white threshold value WhiteThreshold, the pixel is re-classified as being of the contone document type at step 114.

In the pseudo-code segment described above, a test is shown whereat the pixel video level is compared against a black threshold value BlackThreshold. In the preferred embodiment, all pixels in "non-busy" areas with video levels less than the white threshold value WhiteThreshold are re-classified as contone and thus the test against the black threshold is essentially unnecessary. The black threshold test is delineated in the pseudo-code segment and illustrated in the FIGURES only for purposes of completeness of description of the present invention.

With continued reference to FIG. 5, the method 100 does not re-classify pixels that are not beforehand classified as being within a block of pixels that were classified as halftone. At step 102, when the block is not classified as a halftone document type, the individual pixels within the block are not interrogated but, rather, the algorithm proceeds to the next tiled rectangular block within the plurality of rectangular tiled blocks 30–36 comprising the image document 38 until all of the tiled blocks, and pixels therein, have been interrogated and selectively re-classified as necessary and in accordance with the present invention.

The invention has been described with reference to the preferred embodiment. Obviously, modifications and alterations will occur to others upon a reading and understanding of this specification. As an example, text, contone and halftone classifications were discussed and described. It is intended that the invention not be limited to that set of classifier labels or quantity of classification types because it is known that other equivalent or analogous classification labels are used in the art such as, for example, dithered areas, stochastic screen areas and dot regions. Further, other non-equivalent or non-analogous classification types now known or unknown are possible as well. In addition, it is intended that the invention include re-classification of pixels in light areas so that they will be processed in a manner using a transfer function which turns steeply toward pure white but does not jump directly thereto and re-classification of pixels in dark areas so that they will be processed in a manner using a transfer function that best avoids abrupt changes in density levels between halftone areas and continuous tone, non-background areas. Further, it is intended to include all such modifications and alterations insofar as they come within the scope of the appended claims or the equivalents thereof.

Having thus described the invention, it is claimed:

1. A method of post-processing an electronic image of a document that was first divided into a plurality of tiled rectangular blocks of pixels and then processed so that each of the plurality of tiled blocks were classified as a one of a set of classifications including a text document type block, a contone document type block and halftone document type block, the method comprising the steps of:

determining whether a first block of pixels among said plurality of blocks of pixels was classified as a halftone block; and, when said first block of pixels is determined to be classified as a halftone block, for a first pixel within the first tiled block:

calculating a first busyness measure value of said first pixel within said first block;

determining whether the first busyness measure value of the first pixel within said first block is less than a first predetermined threshold value MinPixelS$_{ij}$Threshold;

when the first busyness measure value of the first pixel within said first block is less than said predetermined threshold value MinPixelS$_{ij}$Threshold, determining whether a video intensity level Video_Level(1) of the first pixel within said first block is greater than a second predetermined threshold value White_Threshold;

when the video intensity level Video_Level(1) of the first pixel within said first block is greater than said second predetermined threshold value White_Threshold, re-classifying the first pixel within said first block as a text document type pixel; and, when the video intensity level Video_Level(1) of the first pixel within said first block is less than said second predetermined threshold value White_Threshold, re-classifying the first pixel within said first block as a contone document type pixel.

2. The method of post-processing an electronic image of a document according to claim 1 wherein the step of calculating said first busyness measure value of said first pixel within said first block includes calculating a sum of the absolute values of the Laplacians $S_{ij}(1)$ over a predefined region of pixels surrounding the first pixel within the first block.

3. The method of post-processing an electronic image of a document according to claim 1 further including the step of, when said first block of pixels is determined to be classified as a halftone block, for each of the pixels within said first block:

calculating a busyness measure value $S_{ij}(n)$ of an $n^{th}$ pixel within said first block;

determining whether the busyness measure value $S_{ij}(n)$ of the $n^{th}$ pixel within said first block is less than said first predetermined threshold value MinPixelS$_{ij}$Threshold;

when the busyness measure value $S_{ij}(n)$ of the $n^{th}$ pixel within said first block is less than said first predetermined threshold value MinPixelS$_{ij}$Threshold, determining whether a video intensity level Video_Level(n) of the $n^{th}$ pixel within said first block is greater than a second predetermined threshold value White_Threshold;

when the video intensity level Video_Level(n) of the $n^{th}$ pixel within said first block is greater than said second predetermined threshold value White_Threshold, re-classifying said $n^{th}$ pixel within said first block as a text document type pixel; and, when the video intensity level Video_Level(n) of the $n^{th}$ pixel within said first block is less than said second predetermined threshold value White_Threshold, re-classifying said $n^{th}$ pixel within said first block as a contone document type pixel.

4. The method of post-processing an electronic image of a document according to claim 1 further comprising, for each of the blocks of the electronic image of the document, the steps of:

determining whether an $m^{th}$ block of pixels was classified as a halftone block; and, when said $m^{th}$ block of pixels is determined to be classified as a halftone block, for each of the pixels within the $m^{th}$ block:

calculating a busyness measure value $S_{ij}(n)$ of an $n^{th}$ pixel within said $m^{th}$ block;

determining whether the busyness measure value $S_{ij}(n)$ of the $n^{th}$ pixel within said $m^{th}$ block is less than said first predetermined threshold value MinPixelS$_{ij}$Threshold;

when the busyness measure value $S_{ij}(n)$ of the $n^{th}$ pixel within said $m^{th}$ block is less than said first predetermined threshold value MinPixelS$_{ij}$Threshold, determining whether a video intensity level Video_Level(n) of the $n^{th}$ pixel within said $m^{th}$ block is greater than a second predetermined threshold value White_Threshold;

when the video intensity level Video_Level(n) of the $n^{th}$ pixel within said $m^{th}$ block is greater than said second predetermined threshold value White_Threshold, re-classifying said $n^{th}$ pixel within said $m^{th}$ block as a text document type pixel; and, when the video intensity level Video_Level(n) of the $n^{th}$ pixel within said $m^{th}$ block is less than said second predetermined threshold value White_Threshold, re-classifying said $n^{th}$ pixel within said $m^{th}$ block as a contone document type pixel.

5. A method of post-processing an electronic image of a document that was first divided into a plurality of tiled rectangular blocks of pixels and then processed so that each of the plurality of tiled blocks were classified as a one of a plurality of document type classifications such as a text document type, a contone document type and a halftone document type, the method comprising the steps of:

determining whether a first block of pixels among said plurality of blocks of pixels was classified as a halftone block; and, when said first block of pixels is determined to be classified as a halftone block, for a first pixel within the first tiled block:

calculating a first busyness measure value of said first pixel within said first block;

determining whether the first busyness measure value of the first pixel within said first block is less than a first predetermined threshold value MinPixelS$_{ij}$Threshold;

when the first busyness measure value of the first pixel within said first block is less than said predetermined threshold value MinPixelS$_{ij}$Threshold, determining whether a video intensity level Video_Level(1) of the first pixel within said first block is greater than a second predetermined threshold value White_Threshold; and, when the video intensity level Video_Level(1) of the first pixel within said first block is greater than said second predetermined threshold value White_Threshold, re-classifying the first pixel within said first block as a text document type pixel.

6. The method of post-processing an electronic image of a document according to claim 5 wherein the step of calculating said first busyness measure value of said first pixel within said first block includes calculating a sum of the absolute values of the Laplacians $S_{ij}(1)$ over a predefined region of pixels surrounding the first pixel within the first block.

7. The method of post-processing an electronic image of a document according to claim 6 further including the step of foregoing re-classifying said first block of pixels when the first block of pixels is determined not to be classified as a halftone block.

8. The method of post-processing an electronic image of a document according to claim 6 further including the step of retaining a halftone document type pixel classification for the first pixel within said first block when the first busyness measure value $S_{ij}(1)$ of the first pixel within said first block is greater than or equal to said first predetermined threshold value MinPixelS$_{ij}$Threshold.

9. The method of post-processing an electronic image of a document according to claim 6 further including the step of classifying the first pixel within said first block as a contone document type pixel when the video intensity level Video_Level(1) of the first pixel within said first block is less than or equal to said second predetermined threshold value White_Threshold.

10. The method of post-processing an electronic image of a document according to claim 5 further including the step of, when said first block of pixels is determined to be classified as a halftone block, for each of the pixels within said first block:

calculating a busyness measure value $S_{ij}(n)$ of an $n^{th}$ pixel within said first block; and, determining whether the busyness measure value $S_{ij}(n)$ of the $n^{th}$ pixel within said first block is less than said first predetermined threshold value MinPixelS$_{ij}$Threshold;

when the busyness measure value $S_{ij}(n)$ of the $n^{th}$ pixel within said first block is less than said first predetermined threshold value MinPixelS$_{ij}$Threshold, determining whether a video intensity level Video_Level(n) of the $n^{th}$ pixel within said first block is greater than a second predetermined threshold value White_Threshold; and, when the video intensity level Video_Level(n) of the $n^{th}$ pixel within said first block is greater than said second predetermined threshold value White_Threshold, re-classifying said $n^{th}$ pixel within said first block as a text document type pixel.

11. The method of post-processing an electronic image of a document according to claim 10 wherein the step of calculating said busyness measure value of said $n^{th}$ pixel within said first block includes calculating a sum of the absolute values of the Laplacians $S_{ij}(n)$ over a predefined region of pixels surrounding the $n^{th}$ pixel within the first block.

12. The method of post-processing an electronic image of a document according to claim 11 further including the step of foregoing re-classifying said first block of pixels when the first block is determined not to be classified as a halftone block.

13. The method of post-processing an electronic image of a document according to claim 11 further including the step of retaining a halftone document type pixel classification for ones of the pixels within said first block when the busyness measure values of said ones of the pixels within said first block are greater than or equal to said first predetermined threshold value MinPixelS$_{ij}$Threshold.

14. The method of post-processing an electronic image of a document according to claim 11 further including the step of classifying ones of said pixels within said first block as contone document type pixels when the video intensity levels of said ones of the pixels within said first block are less than or equal to said second predetermined threshold value White_Threshold.

15. The method of post-processing an electronic image of a document according to claim 5 further comprising, for each of the tiled blocks of the electronic image of the document, the steps of:

determining whether an $m^{th}$ block of pixels was classified as a halftone block; and, when said $m^{th}$ block of pixels is determined to be classified as a halftone block, for each of the pixels within the $m^{th}$ block:

calculating a busyness measure value $S_{ij}(n)$ of an $n^{th}$ pixel within said $m^{th}$ block;

determining whether the busyness measure value $S_{ij}(n)$ of the $n^{th}$ pixel within said $m^{th}$ block is less than said first predetermined threshold value MinPixelS$_{ij}$Threshold;

when the busyness measure value $S_{ij}(n)$ of the $n^{th}$ pixel within said $m^{th}$ block is less than said first predetermined threshold value MinPixelS$_{ij}$Threshold, determining whether a video intensity level Video_Level(n) of the $n^{th}$ pixel within said $m^{th}$ block is greater than a second predetermined threshold value White_Threshold; and, when the video intensity level Video_Level(n) of the $n^{th}$ pixel within said $m^{th}$ block is greater than said second predetermined threshold value White_Threshold, re-classifying said $n^{th}$ pixel within said $m^{th}$ block as a text document type pixel.

16. A method of post-processing an electronic image of a document that was first divided into a plurality of tiled rectangular blocks of pixels and then processed so that each of the plurality of tiled blocks were classified as a one of a plurality of document type classifications such as a text document type, a contone document type and a halftone document type, the method comprising the steps of:

determining whether a first block of pixels among said plurality of blocks of pixels was classified as a halftone block; and, when said first block of pixels is determined to be classified as a halftone block, for a first pixel within the first tiled block:

calculating a first busyness measure value of said first pixel within said first block;

determining whether the first busyness measure value of the first pixel within said first block is less than a first predetermined threshold value MinPixelS$_{ij}$Threshold;

when the first busyness measure value of the first pixel within said first block is less than said predetermined threshold value MinPixelS$_{ij}$Threshold, determining whether a video intensity level Video_Level(1) of the first pixel within said first block is less than a second predetermined threshold value White_Threshold; and, when the video intensity level Video_Level(1) of the first pixel within said first block is less than said second predetermined threshold value White_Threshold, re-classifying the first pixel within said first block as a contone document type pixel.

17. The method of post-processing an electronic image of a document according to claim 16 wherein the step of calculating said first busyness measure value of said first pixel within said first block includes calculating a sum of the absolute values of the Laplacians $S_{ij}(1)$ over a predefined region of pixels surrounding the first pixel within the first block.

18. The method of post-processing an electronic image of a document according to claim 17 further including the step of classifying the first pixel within said first block as a text document type pixel when the video intensity level Video_Level(1) of the first pixel within said first block is greater than or equal to said second predetermined threshold value White_Threshold.

19. The method of post-processing an electronic image of a document according to claim 17 further including the step of, when said first block of pixels is determined to be classified as a halftone block, for each of the pixels within said first block:

calculating a busyness measure value $S_{ij}(n)$ of an $n^{th}$ pixel within said first block;

determining whether the busyness measure value $S_{ij}(n)$ of the $n^{th}$ pixel within said first block is less than said first predetermined threshold value MinPixelS$_{ij}$Threshold;

when the busyness measure value $S_{ij}(n)$ of the $n^{th}$ pixel within said first block is less than said first predetermined threshold value MinPixelS$_{ij}$Threshold, determining whether a video intensity level Video_Level(n) of the $n^{th}$ pixel within said first block is less than a second predetermined threshold value White_Threshold; and, when the video intensity level Video_Level(n) of the $n^{th}$ pixel within said first block is less than said second predetermined threshold value White_Threshold, re-classifying said $n^{th}$ pixel within said first block as a contone document type pixel.

20. The method of post-processing an electronic image of a document according to claim 17 further comprising, for each of the tiled blocks of the electronic image of the document, the steps of:

determining whether an $m^{th}$ tiled block of pixels was classified as a halftone block; and, when said $m^{th}$ block of pixels is determined to be classified as a halftone block, for each of the pixels within the $m^{th}$ block:

calculating a busyness measure value $S_{ij}(n)$ of an $n^{th}$ pixel within said $m^{th}$ block;

determining whether the busyness measure value $S_{ij}(n)$ of the $n^{th}$ pixel within said $m^{th}$ block is less than said first predetermined threshold value MinPixelS$_{ij}$Threshold;

when the busyness measure value $S_{ij}(n)$ of the $n^{th}$ pixel within said $m^{th}$ block is less than said first predetermined threshold value MinPixelS$_{ij}$Threshold, determining whether a video intensity level Video_Level(n) of the $n^{th}$ pixel within said $m^{th}$ block is less than a second predetermined threshold value White_Threshold; and, when the video intensity level Video_Level(n) of the $n^{th}$ pixel within said $m^{th}$ block is less than said second predetermined threshold value White_Threshold, re-classifying said $n^{th}$ pixel within said $m^{th}$ block as a contone document type pixel.

\* \* \* \* \*